United States Patent
Oshima et al.

(10) Patent No.: US 10,406,878 B2
(45) Date of Patent: Sep. 10, 2019

(54) AMPHIBIOUS VEHICLE

(71) Applicant: MITSUBISHI HEAVY INDUSTRIES, LTD., Tokyo (JP)

(72) Inventors: Takaaki Oshima, Tokyo (JP); Takashi Matsunaga, Tokyo (JP); Shinichi Sato, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 16/063,402

(22) PCT Filed: Feb. 22, 2017

(86) PCT No.: PCT/JP2017/006629
§ 371 (c)(1),
(2) Date: Jun. 18, 2018

(87) PCT Pub. No.: WO2017/469331
PCT Pub. Date: Oct. 5, 2017

(65) Prior Publication Data
US 2019/0001771 A1 Jan. 3, 2019

(30) Foreign Application Priority Data
Mar. 30, 2016 (JP) .................................. 2016-068157

(51) Int. Cl.
*B60F 3/00* (2006.01)

(52) U.S. Cl.
CPC .................................. *B60F 3/0015* (2013.01)

(58) Field of Classification Search
CPC .................................. B60F 3/0015; B60F 3/00
See application file for complete search history.

(56) References Cited

U.S. PATENT DOCUMENTS

| | | | | |
|---|---|---|---|---|
| 3,238,913 A | * | 3/1966 | Slemmons | B60F 3/0015 440/12.64 |
| 3,898,949 A | | 8/1975 | Kearsey | |

FOREIGN PATENT DOCUMENTS

| | | |
|---|---|---|
| JP | 47-4654 B | 2/1972 |
| JP | 2000-255232 A | 9/2000 |
| JP | 2013-159184 A | 8/2013 |

OTHER PUBLICATIONS

International Preliminary Report on Patentability dated Oct. 11, 2018 in corresponding International PCT Application No. PCT/JP2017/006629.
International Search Report of PCT/JP2017/006629 dated Mar. 21, 2017.

* cited by examiner

*Primary Examiner* — Stephen P Avila
(74) *Attorney, Agent, or Firm* — Birch, Stewart, Kolasch & Birch, LLP

(57) ABSTRACT

An amphibious vehicle according to some embodiments includes a vehicle body, a plurality of wheels disposed on each of both sides of the vehicle body, a crawler disposed on each of both sides of the vehicle body so as to surround the plurality of wheels, and one or more wheel covers mounted to an outer side or an inner side of at least one wheel of the plurality of wheels so as to cover a side surface of the wheel.

12 Claims, 8 Drawing Sheets

Vehicle-body width direction

View A

View B

View C

View D

Section E-E

AMPHIBIOUS VEHICLE

TECHNICAL FIELD

The present disclosure relates to an amphibious vehicle.

BACKGROUND ART

Conventionally, some approaches have been made to reduce on-water resistance of an amphibious vehicle.

For instance, Patent Document 1 discloses an amphibious vehicle, without crawlers, including side covers disposed on both side surfaces of a vehicle body so as to cover upper parts of wheels during traveling under water or on water.

Patent Document also discloses a tracked amphibious vehicle including crawlers which are mounted with many blocks formed of a light-weight material such that the crawlers act as a float.

CITATION LIST

Patent Literature

Patent Document 1: JP2013-159184A
Patent Document 2: JP2000-255232A

SUMMARY

Problems to be Solved

Besides, in a tracked amphibious vehicle, wheels (e.g., sprocket wheels, roller wheels, and idler wheels) surrounded by a crawler have convex and concave around a junction between a wheel central portion and a suspension. This convex-concave shape of the wheels causes resistance in the tracked amphibious vehicle. This resistance can cause a reduction in propulsive performance of the amphibious vehicle on water.

In this regard, Patent Document 1 discloses that an amphibious vehicle without crawlers includes side covers disposed on both side surfaces of a vehicle body and covering upper parts of wheels in order to prevent the wheels and a float from colliding with water flow.

However, even if the side covers disclosed in Patent Document 1 are adopted in a tracked amphibious vehicle, it is difficult to completely prevent the water flow from colliding with the wheels surrounded by the crawler since the size of the side covers is restricted in the vehicle-body front-rear direction and in the height direction. When the water flow collides with the wheels, the water flow is disturbed, increasing the resistance.

Patent Document 2 does not disclose a configuration to reduce the resistance applied to a tracked amphibious vehicle from water.

In view of the above problems, an object of some embodiments of the present invention is to provide an amphibious vehicle capable of suppressing the occurrence of turbulence of water flow due to wheels surrounded by a crawler.

Solution to the Problems (1) An amphibious vehicle according to some embodiments comprises: a vehicle body; a plurality of wheels disposed on each of both sides of the vehicle body; a crawler disposed on each of both sides of the vehicle body so as to surround the plurality of wheels; and one or more wheel covers mounted to an outer side or an inner side of at least one wheel of the plurality of wheels so as to cover a side surface of the wheel.

With the above configuration (1), the wheel cover is disposed on an outer side or an inner side of at least one wheel of the plurality of wheels, and thereby it is possible to suppress the occurrence of turbulence of water flow due to the concave-convex shape of the side surface of the wheel. Thus, it is possible to reduce the resistance applied to the amphibious vehicle from water and improve the propulsive performance.

Herein, "outer side" of a wheel means a side of the wheel apart from the center line of the vehicle body in the width direction. Meanwhile, "inner side" of a wheel means a side of the wheel close to the center line of the vehicle body in the width direction.

(2) In some embodiments, in the above configuration (1), an outer surface of the wheel cover is a flat surface.

With the above configuration (2), the outer surface of the wheel cover is a flat surface, and thereby it is possible to effectively suppress the turbulence of water flow near the wheel. Thus, it is possible to effectively improve the propulsive performance.

(3) In some embodiments, in the above configuration (1) or (2), the amphibious vehicle further comprises a suspension via which the wheels are supported on the vehicle body, wherein the wheel cover is disposed so as to cover a junction between the at least one wheel and the suspension.

With the above configuration (3), the junction between the wheel and the suspension is covered with the wheel cover, and thereby it is possible to suppress the turbulence of water flow due to a complicated shape of the junction. Thus, it is possible to effectively improve the propulsive performance of the amphibious vehicle.

(4) In some embodiments, in any one of the above configurations (1) to (3), the wheel cover is mounted to at least one of a sprocket wheel or an idler wheel of the plurality of wheels.

Out of the wheels disposed in the amphibious vehicle, the sprocket wheel and the idler wheel have side surfaces with more complicated concave-convex shapes than the roller wheels or other wheels.

With the above configuration (4), the wheel cover is mounted to the sprocket wheel and the idler wheel, and thereby it is possible to suppress the turbulence caused by the collision of the sprocket wheel and the idler wheel with water flow and thus improve the propulsive performance of the amphibious vehicle.

(5) In some embodiments, in any one of the above configurations (1) to (4), the amphibious vehicle further comprises a sealing part disposed between the at least one wheel and the wheel cover, wherein a watertight space is formed between the wheel cover and the wheel by the sealing part.

With the above configuration (5), the watertight space is formed between the wheel cover and the surface of the wheel, and thus the wheel acts as a float, reducing the volume of a submerged part of the vehicle body. Thus, it is possible to reduce the water resistance applied to the vehicle body, and it is possible to improve the propulsive performance.

(6) In some embodiments, in the above configuration (5), the sealing part includes a first packing disposed on an outer peripheral edge of the wheel cover, and the at least one wheel includes a groove for receiving the first packing disposed on the outer peripheral edge of the wheel cover.

With the above configuration (6), the watertight space formed between the wheel cover and the wheel can be achieved simply at low cost by the sealing part formed by the first packing and the groove.

(7) In some embodiments, in the above configuration (5) or (6), the at least one wheel includes: a rim part; and an inward flange part projecting inwardly in a radial direction of the wheel from the rim part, and the sealing part includes a second packing closing a clearance between the inward flange part of the wheel and the wheel cover.

With the above configuration (7), the sealing part can further improve the watertight performance by closing the clearance between the inward flange part and the wheel cover with the second packing.

(8) In some embodiments, in any one of the above configurations (1) to (7), the amphibious vehicle further comprises a suspension via which the wheels are supported on the vehicle body, wherein the one or more wheel covers include an inner wheel cover mounted to an inner side of the wheel, and wherein the inner wheel cover has a through hole through which the suspension penetrates.

With the above configuration (8), the through hole which penetrates the suspension is provided in the inner wheel cover, and thereby it is possible to mount the wheel cover (inner wheel cover) to an inner side of the wheel without an interference between the inner wheel cover and the suspension. Thus, it is possible to suppress the occurrence of turbulence of water flow due to the concave-convex shape on the inner side of the wheel.

(9) In some embodiments, in the above configuration (8), the inner wheel cover has a divided structure including: a first cover section having a first recess; and a second cover section having a second recess, and the through hole is formed by the first recess and the second recess.

With the above configuration (9), the inner wheel cover has the divided structure, and the through hole is formed by the first recess and the second recess. Thus, it is possible to form the inner wheel cover which can avoid an interference with the suspension, simply at low cost.

(10) In some embodiments, in the above configuration (8) or (9), the amphibious vehicle comprises a third packing for filling a clearance between the suspension and an inner peripheral edge of the through hole of the inner wheel cover.

With the above configuration (10), the clearance between the inner wheel cover and the suspension is filled with the third packing, and thereby the watertight space can be ensured between the wheel and the inner wheel cover. Thus, it is possible to increase the buoyancy of the vehicle body and reduce the volume of the submerged part of the vehicle body. As a result, it is possible to reduce the water resistance to the vehicle body and improve the propulsive performance.

(11) In some embodiments, in any one of the above configurations (1) to (10), the amphibious vehicle further comprises a pair of vehicle body side-covers disposed on both sides of the vehicle body so as to cover an outer side surface of the crawler.

With the above configuration (11), the amphibious vehicle further includes, in addition to the wheel cover described in the above (1), the vehicle body side-cover. Thus, the vehicle body side-cover suppresses the collision of water flow with the wheel, and even if the water flow collides with the wheel, the wheel cover suppresses the occurrence of turbulence due to the wheel. Thus, it is possible to effectively suppress the occurrence of turbulence of water flow around the crawler and improve the propulsive performance of the amphibious vehicle.

Advantageous Effects

According to at least some embodiments of the present invention, it is possible to reduce the resistance applied to an amphibious vehicle from water and improve the propulsive performance during traveling of the amphibious vehicle on water or under water.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
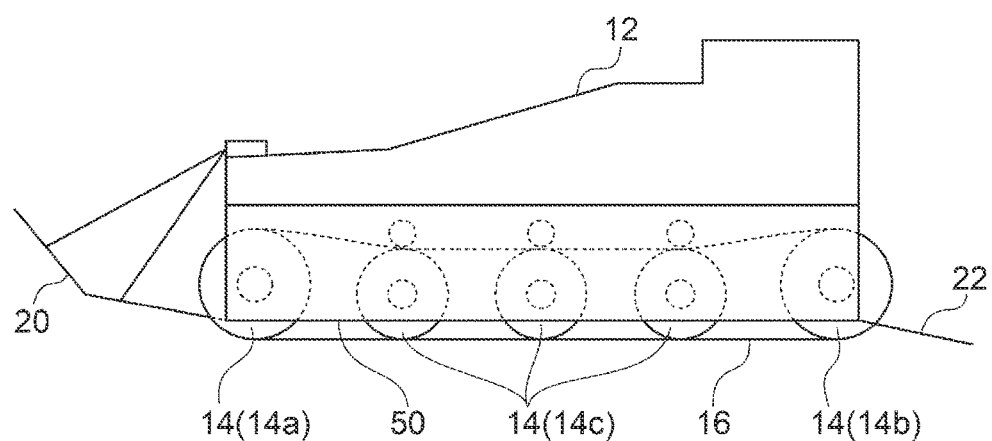
FIG. 1 is a side view of an amphibious vehicle according to an embodiment.
Figure 2:
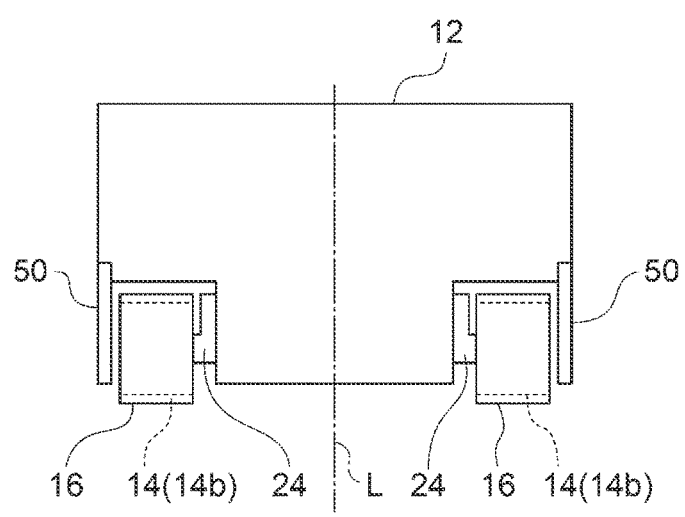
FIG. 2 is a rear view of an amphibious vehicle according to an embodiment.

With reference to FIGS. 1 and 2, firstly, the overall configuration of an amphibious vehicle will be described. FIG. 1 is a side view of an amphibious vehicle according to an embodiment. FIG. 2 is a rear view of the amphibious vehicle shown in FIG. 1.

As shown in FIGS. 1 and 2, in some embodiments, the amphibious vehicle 10 includes a vehicle body 12, a plurality of wheels 14 provided on each of opposite sides of the vehicle body 12, and crawlers 16 surrounding the plurality of wheels 14.

The vehicle body 12 may include a front flap 20 and a rear flap 22 respectively disposed on a front part and a rear part of the vehicle body 12.

In this case, the amphibious vehicle 10 can achieve lift by the front flap 20 and the rear flap 22 during traveling on water. Thereby, it is possible to reduce the surface area of a submerged part of the vehicle body 12 and thus reduce the water resistance applied to the vehicle body 12.

A pair of vehicle body side-covers 50 may be disposed on both sides of the vehicle body 12. In this case, as shown in FIGS. 1 and 2, each of the vehicle body side-covers 50 is disposed on an outer side in the vehicle-body width direction with a distance from the wheels 14 and the crawler 16 so as to cover an outer side surface of the crawler 16 in the vehicle-body width direction.

The wheels 14 are each rotatably supported on the vehicle body 12 via a suspension 24 (see FIG. 2) described later.

Additionally, the plurality of wheels 14 may include a sprocket wheel 14a for rotating the crawler 16, an idler wheel 14b disposed opposite to the sprocket wheel 14a and capable of smoothly rotating the crawler 16, and roller wheels 14c disposed between the sprocket wheel 14a and the idler wheel 14b and determining the driving of the crawler 16. In the exemplary embodiment shown in FIG. 1, the sprocket wheel 14a is disposed on a front side of the vehicle body 12, while the idler wheel 14b is disposed on a rear side of the vehicle body 12.

The amphibious vehicle 10 can travel on land by transmitting power from a power source (not shown) to the sprocket wheels 14a and thereby rotating the crawler 16 via the sprocket wheels 14a.

Further, the amphibious vehicle 10 includes a propulsion device such as a water jet and a propeller. This propulsion device enables the vehicle to travel on water.

For the land traveling as described above, the amphibious vehicle 10 is configured such that the wheels 14 are supported on the vehicle body 12 via the suspension 24. Both side surfaces of the wheel 14 have a complicated concave-convex shape around a junction between a central portion of the wheel 14 and the suspension 24. Since the amphibious vehicle 10 with the crawler 16 travels on water while the crawler 16 is submerged, this concave-convex shape of each wheel 14 causes an increase in resistance, thus reducing the propulsive performance on water.

Even if the amphibious vehicle 10 includes the vehicle body side-covers 50, it is difficult to completely prevent water flow from colliding with the wheels 14 surrounded by the crawler 16 since the size of the vehicle body side-covers 50 are restricted in the vehicle-body front-rear direction and in the height direction.

In view of this, in some embodiments, the amphibious vehicle 10 further includes a wheel cover covering a side surface of at least one wheel 14. A later-described wheel cover may be made of a metal or a resin (e.g., fiber reinforced plastic such as CFRP or GFRP). In case of using the resin wheel cover, the weight of the wheel cover can be reduced.

With reference to FIGS. 3 to 6, the configuration of the wheel cover will be described.

Figure 3:
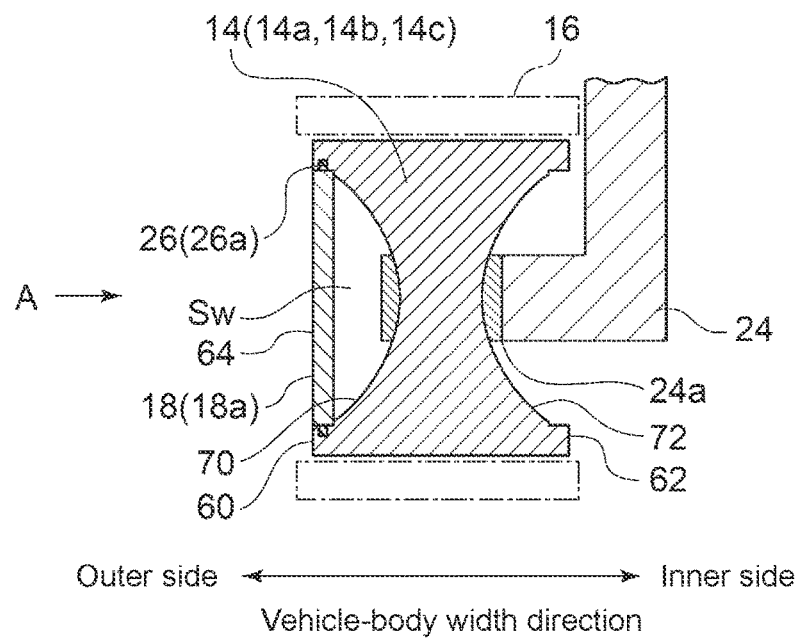
FIG. 3 is a cross-sectional view of a wheel of an amphibious vehicle according to an embodiment.
Figure 4:
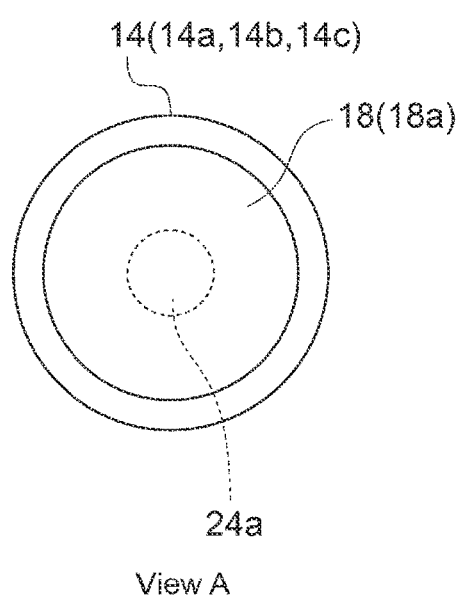
FIG. 4 is an outer front view of a wheel seen from direction A in FIG. 3.
Figure 5:
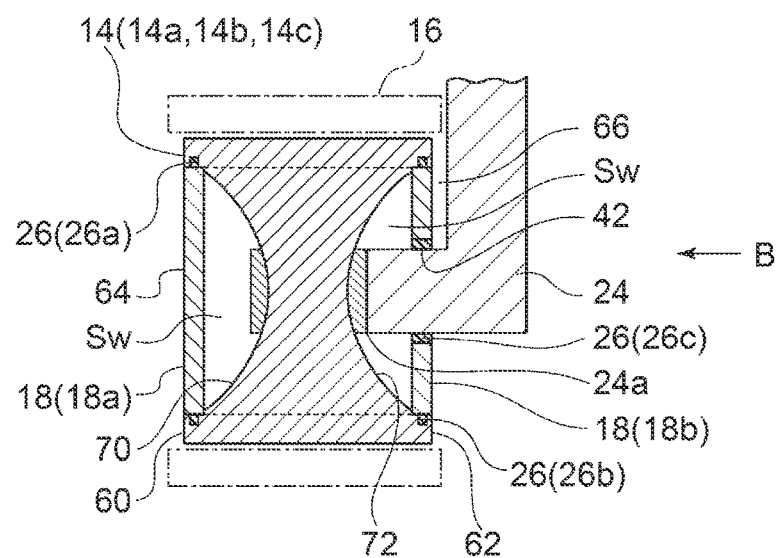
FIG. 5 is a cross-sectional view of a wheel of an amphibious vehicle according to an embodiment.
Figure 6:
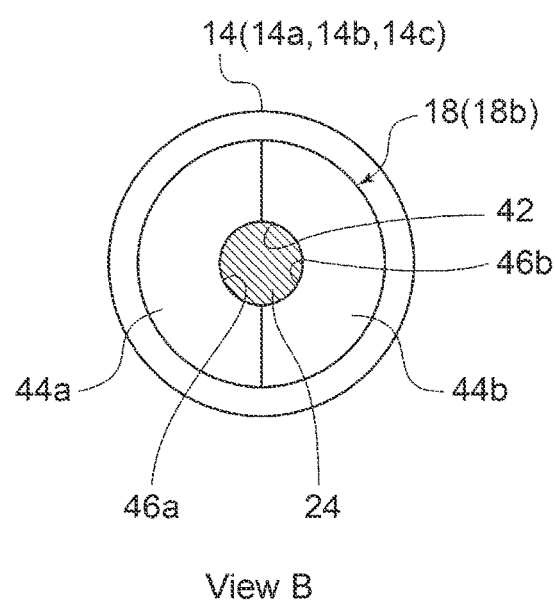
FIG. 6 is an inner front view of a wheel seen from direction B in FIG. 5.

FIG. 3 is a cross-sectional view showing a configuration of a wheel mounted with an outer wheel cover. FIG. 4 is a view of the wheel in FIG. 3 seen from direction A. FIG. 5 is a cross-sectional view showing a configuration of the wheel mounted with an inner wheel cover. FIG. 6 is a view of the wheel in FIG. 5 seen from direction B.

In the embodiment shown in FIGS. 3 and 4, the amphibious vehicle 10 includes a wheel cover 18 (outer wheel cover 18a) mounted to the wheel 14 so as to cover a side surface of the wheel 14. The outer wheel cover 18a is mounted to an outer side of the wheel 14 in the vehicle-body width direction. That is, the outer wheel cover 18a is mounted to the wheel 14 on a side apart from a central line L (see FIG. 2) of the vehicle body 12 in the width direction.

The junction 24a between the central portion of the wheel 14 and the suspension 24 is thus covered with the outer wheel cover 18a, and thereby it is possible to reduce the resistance due to the complicated concave-convex shape of the wheel 14 around the junction 24.

In an embodiment, as shown in FIG. 3, the outer wheel cover 18a is configured such that a surface (outer surface) 64 of the outer wheel cover 18a is aligned with one of both end surfaces (60, 62) of the wheel 14, namely, the end surface (outer end surface) 60 on an outer side in the vehicle-body width direction. The surface 64 of the outer wheel cover 18a itself is a flat surface.

In this case, a flat surface is formed by the outer end surface 60 of the wheel 14 and the surface 64 of the outer wheel cover 18a. Thus, it is possible to efficiently reduce the on-water resistance of the amphibious vehicle 10 by the installment of the outer wheel cover 18a.

Additionally, as shown in FIG. 3, the central portion of the wheel 14 is recessed with respect to the outer end surface 60 so that a recess 70 is formed radially inside the outer end surface 60. The outer wheel cover 18a may be fitted to the recess 70.

When the outer wheel cover 18a is fitted to the recess 70 located radially inside the outer end surface 60 of the wheel 14, the outer wheel cover 18a does not project radially outward from the wheel 14, and it is possible to avoid an interference between the outer wheel cover 18a and the crawler 16 surrounding the wheel 14.

In the embodiment shown in FIGS. 5 and 6, the amphibious vehicle 10 includes, in addition to the outer wheel cover 18a, an inner wheel cover 18b mounted to an inner side of the wheel 14 in the vehicle width direction.

In other embodiments, the amphibious vehicle 10 includes the inner wheel cover 18b instead of the outer wheel cover 18a (i.e., only the inner wheel cover 18b is mounted to the wheel 14).

The inner wheel cover 18b is mounted to the wheel 14 so as to cover an inner side surface of the wheel 14 in the vehicle width direction. That is, the inner wheel cover 18b is mounted to the wheel 14 on a side close to the central line L (see FIG. 2) of the vehicle body 12 in the width direction.

The junction 24a between the central portion of the wheel 14 and the suspension 24 is thus covered with the inner wheel cover 18b, and thereby it is possible to reduce the resistance due to the complicated concave-convex shape of the wheel 14 around the junction 24a.

In an embodiment, as shown in FIG. 5, the inner wheel cover 18b is configured such that a surface (outer surface) 66 of the inner wheel cover 18b is aligned with one of both end surfaces (60, 62) of the wheel 14, namely, the end surface (inner end surface) 62 on an inner side in the vehicle-body width direction. The surface 66 of the inner wheel cover 18b itself is a flat surface.

In this case, a flat surface is formed by the inner end surface 62 of the wheel 14 and the surface 66 of the inner wheel cover 18b. Thus, it is possible to efficiently reduce the on-water resistance of the amphibious vehicle 10 by the installment of the inner wheel cover 18b.

Additionally, as shown in FIG. 5, the central portion of the wheel 14 is recessed with respect to the inner end surface 62 so that a recess 72 is formed radially inside the inner end surface 62. The inner wheel cover 18b may be fitted to the recess 72.

When the inner wheel cover 18b is fitted to the recess 72 located radially inside the inner end surface 62 of the wheel 14, the inner wheel cover 18b does not project radially outward from the wheel 14, and it is possible to avoid the interference between the inner wheel cover 18b and the crawler 16 surrounding the wheel 14.

Additionally, in the embodiment shown in FIGS. 5 and 6, a through hole 42 into which the suspension 24 can be inserted is provided in a central portion of the inner wheel cover 18b.

Such a through hole 42 provided in the inner wheel cover 18b enables the inner wheel cover 18b to be mounted to an inner side of the wheel 14 without an interference between the inner wheel cover 18b and the suspension 24. Thus, it is possible to suppress the occurrence of turbulence of water flow due to the concave-convex shape on the inner side of the wheel 14.

Further, as shown in FIG. 6, the inner wheel cover 18b has a divided structure including a first cover section 44a and a second cover section 44b.

A semicircular recess 46a is formed on an inner peripheral side of the first cover section 44a. Meanwhile, a semicircular recess 46b is formed on an inner peripheral side of the second cover section 44b. The inner wheel cover 18b is formed by joining these pair of cover sections 44a, 44b. The through hole 42 for inserting the suspension 24 is formed by joining the recesses 46a, 46b of the respective cover sections 44a, 44b.

Such a divided inner wheel cover 18b including the through hole 42 for inserting the suspension 24 ensures the inner wheel cover 18b that can avoid the interference with the suspension 24, simply at low cost.

The wheel cover 18 (18a, 18b) described above with reference to FIGS. 3 to 6 may be mounted to at least one of the sprocket wheel 14a or the idler wheel 14b of the plurality of wheels 14. In an embodiment, the above-described wheel cover 18 (18a, 18b) is mounted to all of the wheels 14.

Out of the wheels 14 disposed in the amphibious vehicle 10, the sprocket wheel 14a and the idler wheel 14b have side surfaces with more complicated concave-convex shapes than the roller wheels 14c. Accordingly, as described above, when the wheel cover 18 (18a, 18b) is mounted to at least one of the sprocket wheel 14a or the idler wheel 14b of the plurality of wheels 14, it is possible to suppress the turbulence caused by the collision of the sprocket wheel 14a and the idler wheel 14b with water flow and thus improve the propulsive performance of the amphibious vehicle 10.

In some embodiments, the amphibious vehicle 10 is configured such that a watertight space Sw is formed by using the wheel cover 18 (18a, 18b), and the watertight space Sw provides buoyancy to the wheel 14.

The watertight space Sw is a space surrounded by an inner surface of the wheel cover 18 (18a, 18b) and a wall surface of the recess (70, 72) of the wheel 14 facing this inner surface.

To form the watertight space Sw, as shown in FIGS. 3 and 5, a sealing part 26 (26a, 26b) may be disposed between the wheel cover 18 (18a, 18b) and the wheel 14. The sealing part 26 is configured so as to form the watertight space Sw between the wheel cover 18 and the wheel.

When the watertight space Sw is formed between the side surface of the wheel 14 and the wheel cover 18, the wheel 14 acts as a float, reducing the volume of the submerged part of the vehicle body 12. Thus, it is possible to reduce the water resistance applied to the vehicle body 12. As a result, it is possible to improve the propulsive performance of the amphibious vehicle 10. A specific configuration of the sealing part 26 (26a, 26b) will be described later.

To form the watertight space Sw between the inner wheel cover 18b and the wheel 14, as shown in FIG. 5, the amphibious vehicle 10 may further include a third packing 26c for filling a clearance between the suspension 24 and an inner peripheral edge of the through hole 42 of the inner wheel cover 18b.

When the clearance between the inner wheel cover 18b and the suspension 24 is filled with the third packing 26c, the watertight space Sw can be obtained between the wheel 14 and the inner wheel cover 18b. In this way, the watertight space Sw increases the buoyancy of the vehicle body 12 and reduces the volume of the submerged part of the vehicle body 12. Thus, it is possible to reduce the water resistance to the vehicle body 12 and improve the propulsive performance of the amphibious vehicle 10.

Next, with reference to FIGS. 7 to 11, a structure where the wheel cover 18 (18a, 18b) is mounted to the wheel 14 and a structure of the sealing part 26 (26a, 26b) will be described.

Figure 7:
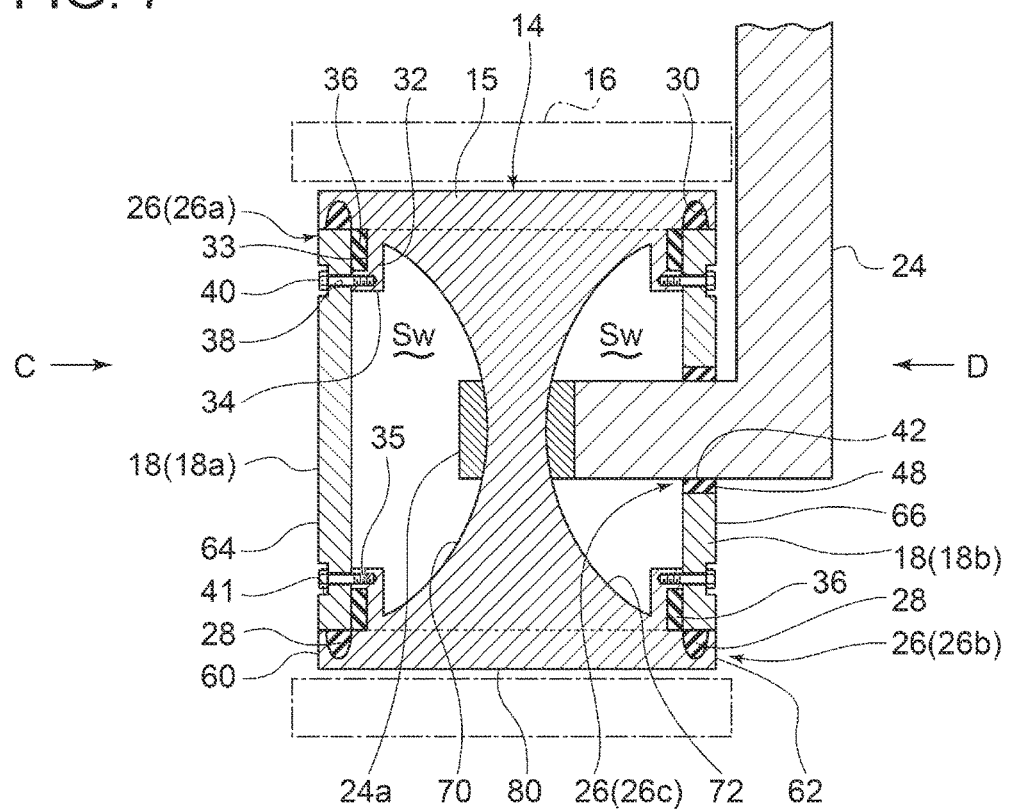
FIG. 7 is a cross-sectional view of a peripheral structure of a wheel according to an embodiment.
Figure 8:
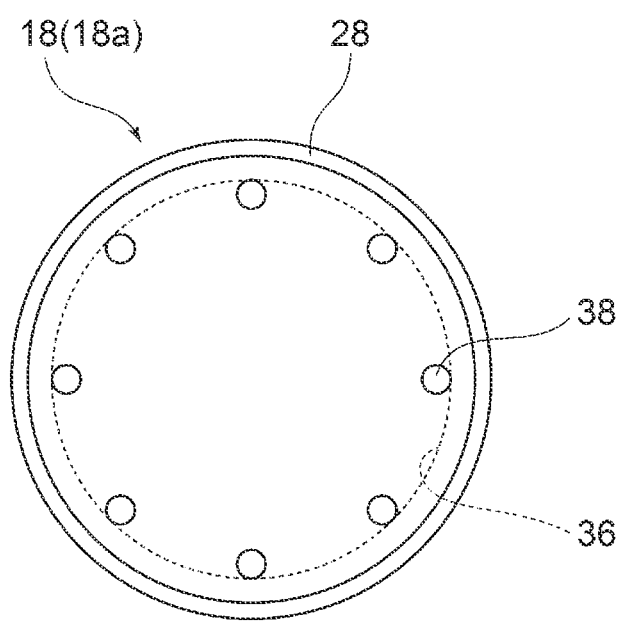
FIG. 8 is an outer front view of a wheel seen from direction C in FIG. 7.
Figure 9:
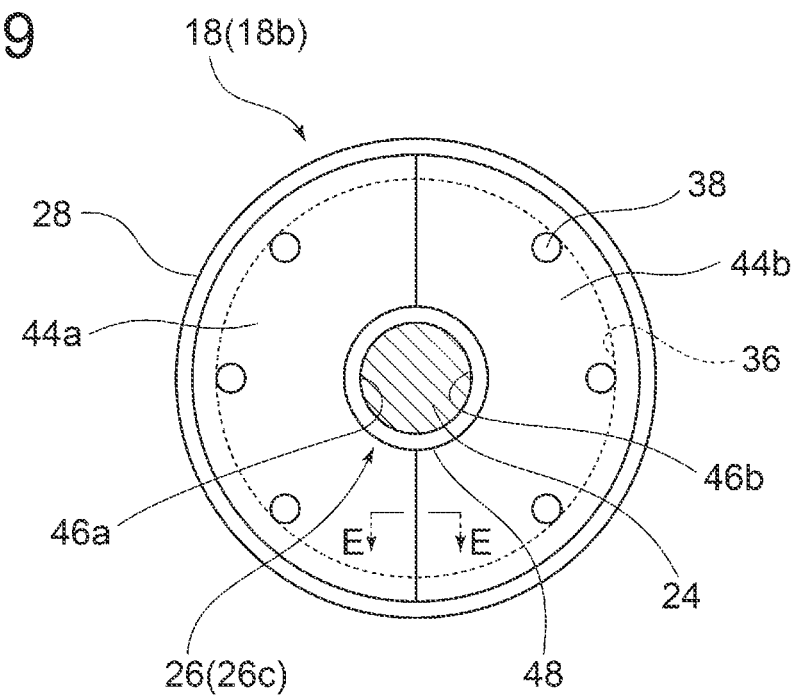
FIG. 9 is an inner front view of a wheel seen from direction D in FIG. 7.
Figure 10:
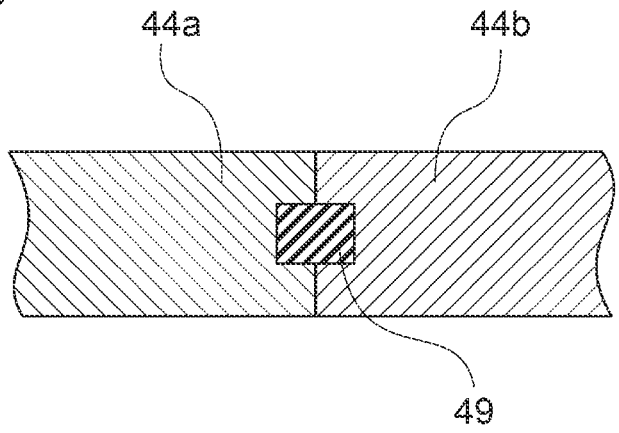
FIG. 10 is a cross-sectional view taken along line E-E in FIG. 9.
Figure 11:
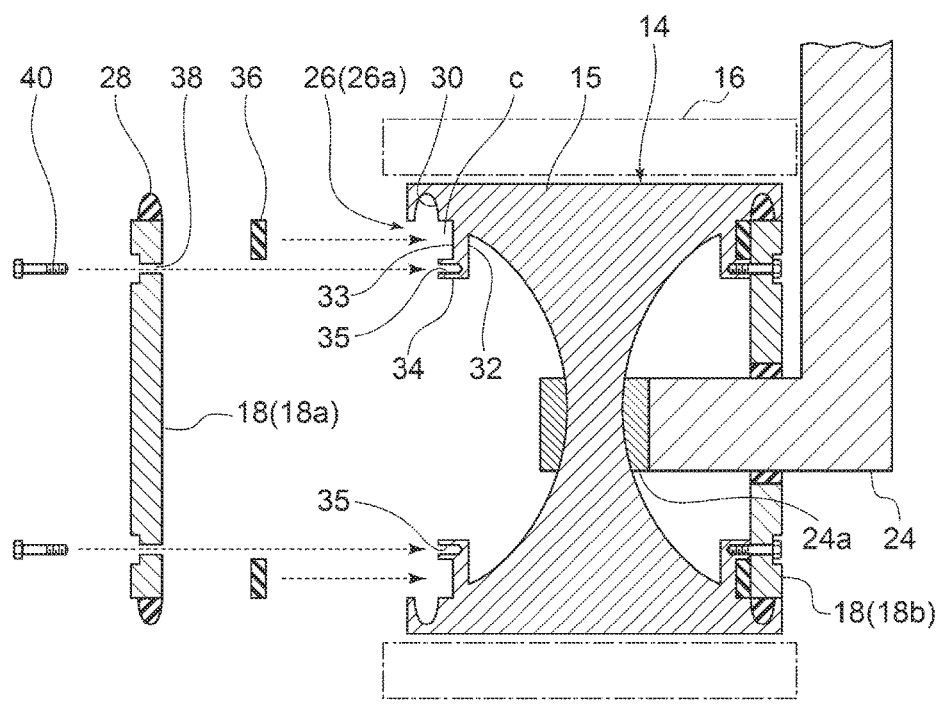
FIG. 11 is a cross-sectional diagram showing a structure where a wheel cover is mounted to a wheel according to an embodiment.

FIG. 7 is a cross-sectional view of a peripheral structure of a wheel according to an embodiment. FIG. 8 is a view in a direction of arrow C in FIG. 7. FIG. 9 is a view in a direction of arrow D in FIG. 7. FIG. 10 is a cross-sectional view taken along line E-E in FIG. 9. FIG. 11 is a diagram showing a structure where the wheel cover is mounted to the wheel according to an embodiment.

As shown in FIGS. 7 and 11, in some embodiments, the wheel cover 18 (18a, 18b) is mounted to the wheel 14 with a fastening member 40. FIGS. 7 and 11 show an example using a bolt as the fastening member 40.

More specifically, the wheel 14 includes a rim part 15 forming an outer peripheral surface 80 and both end surfaces 60, 62 of the wheel 14, and an inward flange part 32 projecting radially inward from the rim part 15. As shown in FIG. 7, an annular connection part 34 is disposed on an inner peripheral side of the inward flange part 32. An end surface of the annular connection part 34 is flat to abut on the wheel cover 18. The connection part 34 is provided with a plurality of bolt holes 35 arranged in the circumferential direction. In accordance with an interval between the bolt holes 35 circumferentially adjacent to each other, a plurality of through holes 38 is provided in the wheel cover 18 (18a, 18b) (see FIGS. 8 and 9). The bolts 40 respectively penetrates the though holes 38 of the wheel cover 18 (18a, 18b) and are screwed into the bolt holes 35 of the connection part 34 of the wheel 14. The wheel cover 18 (18a, 18b) is thus fastened to the wheel 14 with the bolts 40, which prevents the wheel cover 18 (18a, 18b) from being detached from the wheel 14.

The top of the bolt 40 may be designed so as to fit to a recess 41 disposed in the wheel cover 18 (18a, 18b). In this case, since the top of the bolt 40 does not project from the outer surface 64, 66 of the wheel cover 18 (18a, 18b), it is possible to reduce resistance due to the bolt 40.

In some embodiments, as shown in FIGS. 7 and 11, the sealing part 26 (26a, 26b) includes an annular first packing 28 disposed at an outer peripheral edge of the wheel cover 18 (18a, 18b). The first packing 28 may be a rubber packing (elastic packing) and may be mounted to the outer peripheral edge of the wheel cover 18 (18a, 18b) by vulcanizing bonding.

The first packing 28 is received by a groove 30 formed in an inner peripheral surface of the rim part 15 of the wheel 14. The groove 30 is positioned such that the first packing 28 disposed at the outer peripheral edge of the wheel cover 18 (18a, 18b), which is connected to the connection part 34 of the inward flange part 32 with the bolt 40, is fitted to the groove 30 on a side apart from a widthwise center of the wheel 14 with respect to the inward flange part 32.

Thus, using the first packing 28, it is possible to ensure the watertight space Sw formed between the wheel cover 18 (18a, 18b) and the wheel 14 simply at low cost.

In some embodiments, as shown in FIGS. 7 and 11, the sealing part 26 (26a, 26b) includes a second packing 36 closing a clearance c (see FIG. 11) between the inward flange part 32 of the wheel 14 and the wheel cover 18 (18a, 18b).

In the example shown in FIGS. 7 and 11, the second packing 36 is fitted to a recess 33 disposed on a surface, which faces the wheel cover 18 (18a, 18b), of the inward flange part 32. The second packing 36 is annularly disposed on an outer peripheral side of the bolt 40. The watertight performance can be further improved by closing the clearance c between the inward flange part 32 and the wheel cover 18 (18a, 18b).

In other embodiments, instead of forming the recess 33 in the inward flange part 32 or in addition to the recess 33, a recess may be formed on a surface of the wheel cover 18 which faces the recess 33, and this recess may be filled with the second packing 36.

Between the inner peripheral edge of the through hole 42 of the inner wheel cover 18b and the suspension 24 is disposed the third packing 26c as described above with reference to FIG. 5.

As described above, the use of the first packing 28, the second packing 36, and the third packing 48 ensures the watertight space Sw to be formed between the wheel cover 18 (18a, 18b) and the wheel 14 at low cost.

In the embodiment shown in FIGS. 9 and 10, a recess is formed on respective abutment surfaces where the first cover section 44a and the second cover section 44b constituting the inner wheel cover 18b are jointed. These recesses are filled with a packing 49.

This prevents water from entering the watertight space Sw through the abutment surfaces of the first cover section 44a and the second cover section 44b even when the inner wheel cover 18b has a divided structure.

The amphibious vehicle 10 according to some embodiments of the present invention has been described above. With the amphibious vehicle 10 according to the above-described embodiments, the wheel cover 18 (18a, 18b) is disposed on an outer side or an inner side of at least one wheel 14, and thereby it is possible to suppress the occurrence of turbulence of water flow due to the concave-convex shape of the side surface of the wheel 14. Thus, it is possible to reduce the resistance applied to the amphibious vehicle 10 from water and improve the propulsive performance.

Figure 12:
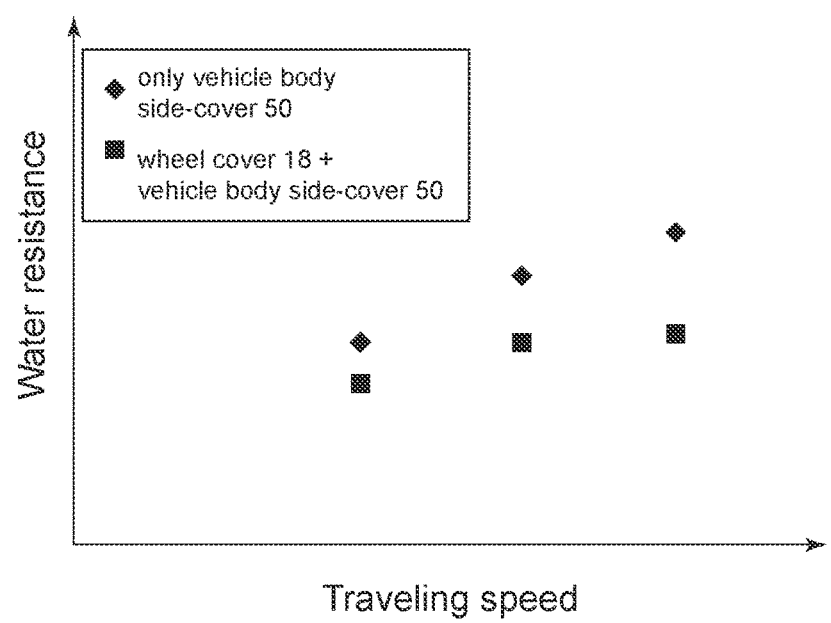
FIG. 12 is a graph comparing water resistance between an embodiment and a comparative example.

FIG. 12 is a graph showing a relationship between the water resistance and the traveling speed of the amphibious vehicle 10 according to the present embodiment. FIG. 12 also shows the water resistance in case of providing only the vehicle body side-cover 50 as a comparative example.

As shown in the same figure, the present embodiment exhibits more excellent resistance reduction effect than the comparative example. The reason appears to be that, since the amphibious vehicle 10 according to the present embodiment includes both the wheel cover 18 and the vehicle body side-cover 50, the vehicle body side-cover 50 suppresses the collision of water flow with the wheel 14 and, even if the water flow collides with the wheel 14, the wheel cover 18 (18a, 18b) can suppress the occurrence of turbulence due to the wheel 14.

REFERENCE SIGNS LIST

10 Amphibious vehicle
12 Vehicle body
14 (14a, 14b, 14c) Wheel
14a Sprocket wheel
14b Idler wheel
14c Roller wheel
15 Rim part
16 Crawler
18 Wheel cover
18a Outer wheel cover
18b Inner wheel cover
20 Front flap
22 Rear flap
24 Suspension
24a Junction
26 (26a, 26b, 26c) sealing part
28 First packing
30 Groove
32 Inward flange part
33 Recess
34 Connection part
36 Second packing
38, 42 Though hole
40 Fastening member (Bolt)
44a First cover section
44b Second cover section
46a First recess
46b Second recess
48 Third packing
49 Packing
50 Vehicle body side-cover
Sw Watertight space
c Clearance

The invention claimed is:

1. An amphibious vehicle comprising:
a vehicle body;
a plurality of wheels disposed on each of both sides of the vehicle body;
a crawler disposed on each of both sides of the vehicle body so as to surround the plurality of wheels; and
one or more wheel covers mounted to an outer side or an inner side of at least one wheel of the plurality of wheels so as to cover a side surface of the wheel
wherein the wheel cover is mounted to at least one of a sprocket wheel or an idler wheel of the plurality of wheels.

2. The amphibious vehicle according to claim 1, wherein an outer surface of the wheel cover is a flat surface.

3. The amphibious vehicle according to claim 1, further comprising a suspension via which the wheels are supported on the vehicle body,
wherein the wheel cover is disposed so as to cover a junction between the at least one wheel and the suspension.

4. An amphibious vehicle comprising:
a vehicle body;
a plurality of wheels disposed on each of both sides of the vehicle body;
a crawler disposed on each of both sides of the vehicle body so as to surround the plurality of wheels;
one or more wheel covers mounted to an outer side or an inner side of at least one wheel of the plurality of wheels so as to cover a side surface of the wheel; and
a sealing part disposed between the at least one wheel and the wheel cover,
wherein a watertight space is formed between the wheel cover and the wheel by the sealing part.

5. The amphibious vehicle according to claim 4,
wherein the sealing part includes a first packing disposed on an outer peripheral edge of the wheel cover, and
wherein the at least one wheel includes a groove for receiving the first packing disposed on the outer peripheral edge of the wheel cover.

6. The amphibious vehicle according to claim 4,
wherein the at least one wheel includes:
a rim part; and
an inward flange part projecting inwardly in a radial direction of the wheel from the rim part, and
wherein the sealing part includes a second packing closing a clearance between the inward flange part of the wheel and the wheel cover.

7. An amphibious vehicle comprising:
a vehicle body;
a plurality of wheels disposed on each of both sides of the vehicle body;
a crawler disposed on each of both sides of the vehicle body so as to surround the plurality of wheels;
one or more wheel covers mounted to an outer side or an inner side of at least one wheel of the plurality of wheels so as to cover a side surface of the wheel; and
a suspension via which the wheels are supported on the vehicle body,
wherein the one or more wheel covers include an inner wheel cover mounted to an inner side of the wheel, and
wherein the inner wheel cover has a through hole through which the suspension penetrates.

8. The amphibious vehicle according to claim 7,
wherein the inner wheel cover has a divided structure including:
a first cover section having a first recess; and
a second cover section having a second recess, and
wherein the through hole is formed by the first recess and the second recess.

9. The amphibious vehicle according to claim 7, comprising a third packing for filling a clearance between the suspension and an inner peripheral edge of the through hole of the inner wheel cover.

10. The amphibious vehicle according to claim 1, further comprising a pair of vehicle body side-covers disposed on both sides of the vehicle body so as to cover an outer side surface of the crawler.

11. The amphibious vehicle according to claim 4, further comprising a pair of vehicle body side-covers disposed on both sides of the vehicle body so as to cover an outer side surface of the crawler.

12. The amphibious vehicle according to claim 7, further comprising a pair of vehicle body side-covers disposed on both sides of the vehicle body so as to cover an outer side surface of the crawler.

* * * * *